United States Patent
Köhler et al.

[11] Patent Number: 6,102,498
[45] Date of Patent: Aug. 15, 2000

[54] RACK FOR A SWITCHING CABINET

[75] Inventors: Martina Köhler, Herborn; Wolfgang Reuter, Burbach, both of Germany

[73] Assignee: Rittal-Werk Rudolf Loh GmbH & Co. KG, Herborn, Germany

[21] Appl. No.: 09/308,261

[22] PCT Filed: Nov. 6, 1997

[86] PCT No.: PCT/EP97/06151

§ 371 Date: May 14, 1999

§ 102(e) Date: May 14, 1999

[87] PCT Pub. No.: WO98/23009

PCT Pub. Date: May 28, 1998

[30] Foreign Application Priority Data

Nov. 19, 1996 [DE] Germany .............. 196 47 723

[51] Int. Cl.$^7$ .................................................. A47B 81/06
[52] U.S. Cl. ........................................ 312/223.1; 312/229
[58] Field of Search .................................. 312/100, 101, 312/229, 223.1, 265.4, 265.3, 265.2, 265.1; 211/191, 192

[56] References Cited

U.S. PATENT DOCUMENTS

| | | | |
|---|---|---|---|
| 3,028,206 | 4/1962 | Smith | 312/229 |
| 4,691,970 | 9/1987 | Neri . | |
| 5,801,331 | 9/1998 | Zachrai | 312/223.1 |

FOREIGN PATENT DOCUMENTS

| | | |
|---|---|---|
| 2 494 954 | 5/1982 | France . |
| 41 38 887 | 4/1993 | Germany . |
| 42 27 532 | 2/1994 | Germany . |
| 195 06 744 | 4/1996 | Germany . |
| 7-245820 | 1/1996 | Japan . |
| 93 10691 | 6/1993 | WIPO . |

*Primary Examiner*—Peter M. Cuomo
*Assistant Examiner*—Jerry A. Anderson
*Attorney, Agent, or Firm*—Pauley Petersen Kinne & Fejer

[57] ABSTRACT

A rack for a switching cabinet which can be enclosed by side walls, at least one door and a cover and comprises a lower and upper frame which can be connected by frame profiles running vertically. The upper frame has vertical and horizontal struts running horizontally. The vertical and lateral struts include channels where water that runs off from the cover can be collected and drained. Water can then be drained off from the corner areas of the upper frame in a controlled manner if the outlet channels of adjacent vertical and horizontal struts are brought together and fed to a flume of the vertical frame piece.

14 Claims, 2 Drawing Sheets

6,102,498

RACK FOR A SWITCHING CABINET

BACKGROUND OF THE INVENTION

1. Field of the Invention

This invention relates to a rack for a switching cabinet which can be enclosed by side walls, at least one door and a lid and which has a lower frame and an upper frame that can be connected by vertically extending frame profiles, wherein the upper frame has longitudinal struts and lateral struts running horizontally and the struts have runoff channels so that water running off the lid can be collected and drained.

2. Description of Prior Art

Such a rack is known from European Patent Reference EP 0 402 276. With such racks, the upper frame consists of two struts, respectively. These are in the form of hollow profile sections which are connected at their ends at a right angle. For the connection, there is a corner-connecting part to which the struts can be screwed. The corner-connecting part has a receptacle element which is open to the outside and into which a second corner-connecting part can be introduced. At the second corner-connecting part, the vertical frame profile is secured. The runoff channels of the struts direct the collected water up to the corner connections where it is distributed across the individual corner-connecting parts and then runs downward in an uncontrolled manner along the vertical frame profile or the associated side walls.

The two corner-connecting parts must be carefully sealed with respect to each other and with respect to the struts in order to prevent water from reaching an interior of the switching cabinet.

SUMMARY OF THE INVENTION

It is one object of this invention to provide a rack of the initially mentioned type which simply permits controlled drainage of the accumulating water from the corner area of the upper frame.

In accordance with this invention, this object is achieved with runoff channels of adjacent struts brought together in the corner area of the rack and directed to a flume of the vertical frame profile.

The runoff channels meet in the corner areas of the upper frame, so that specific areas for diverting the water are created. Thus the corner connection between the abutting struts as well as the frame profiles can be separated from the water-channeling area. A high degree of operational safety is achieved since the sealing surfaces are no longer exposed to water. A flume of the vertical frame profile directs the water downward.

According to an advantageous embodiment of this invention, the struts have a sealing flange against which the cover is tightly placed wherein the sealing flanges meet to form a surrounding sealing frame at the corners of the sealing frame and wherein downward directed outer walls connect to the sealing flanges which support the runoff channel. The runoff channels of the individual struts extend across the entire periphery of the upper frame. The water can be diverted to the vertical frame profiles only in the corner areas of the upper frame.

In one preferred embodiment of this invention the runoff channels are in a form of strip-like elements which are connected on one broad side to the struts. The runoff channels meet in the corner area of the upper frame at a point where they are connected to the struts and wherein the runoff channels feed at their ends into the flume. At that point, the struts abut directly against one another without the insertion of a corner-connecting part. Thus, the runoff channels also meet. From this point, the introduction into the flume can easily take place.

The feed into the flume may simply be such that the runoff channels formed from the strip-like elements have at their front faces in the corner area of the upper frame a cut-out area. Here, the cut-out areas form the feed.

For the formation of a flume, the vertical frame profiles, at their outer surface facing away from the interior space of the rack, can have a profiled external receptacle element. This external receptacle element is covered by the side walls or the cabinet door. Here, the external receptacle element serves as a flume which cannot be viewed from the outside. Additional parts, such as side wall fastening devices, hinges or locking mechanisms may be mounted on the external receptacle element as well.

The lid covering the rack may, for example, have a surrounding edge which is beveled in the downward direction. This directs the water collected on the cover into the runoff channels. Thus, the lid serves as a feed device assuring that the water is always directed into the runoff channels.

In accordance with this invention, in one embodiment the rack has side walls with and/or the cabinet door with an upper horizontal edge arranged above the runoff channel and at a distance from the runoff channel. This edge prevents impurities from entering the runoff channel and provides an optical closing arrangement, so that it is not possible to see into the runoff channel from the outside.

When the lower and upper frame of the rack are constructed identically, few components are required.

BRIEF DESCRIPTION OF THE DRAWINGS

This invention will be explained in greater detail in the following text by means of an example shown in the drawings, wherein.

DESCRIPTION OF PREFERRED EMBODIMENTS

Figure 1:
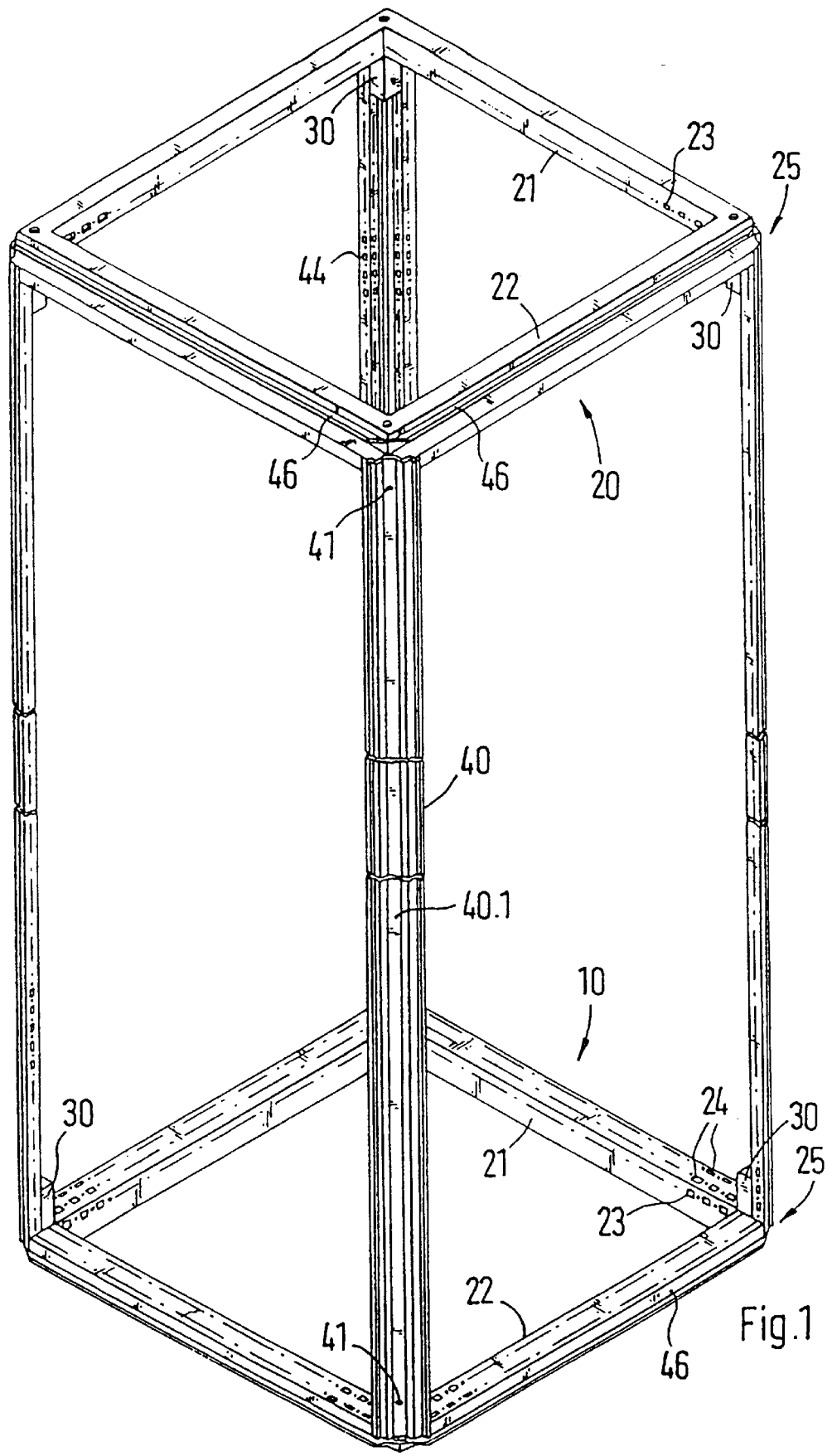
FIG. 1 shows in a perspective view a rack for a switching cabinet having frame profiles.

In FIG. 1, a rack for a switching cabinet is shown. The switching cabinet comprises a lower frame (10), an upper frame (20) and four vertical frame profiles (40). The vertical frame profiles (40) connect the lower frame (10) to the upper frame (20). The lower and upper frames (10 and 20) are identically constructed so that they are interchangeable.

The lower and the upper frames (10 and 20), respectively, have two longitudinal struts and two lateral struts (21, 22). The struts (21, 22) have on their profiled sides facing the interior of the rack rows of attachment mountings (23, 24). Also the vertical frame profiles (40) have attachment mountings (44) facing toward the interior of the rack. On the attachment mountings (23, 24, 44), electrical installations or mounting aids, such as mounting rails, can be attached.

The vertical frame profiles (40) are connected by connectors (30) to the lower or upper frames (10, 20). The connectors (30) are arranged in an area of the corner mountings (25) for receiving the lower or upper frame (10, 20). The attachment of the vertical frame profiles (40) to the connector (30) takes place, for example, by means of threaded fastenings. Thus, the vertical frame profiles (40) may have at their ends threaded sockets (41).

As shown in FIG. 1, the individual struts (21, 22) have runoff channels (46).

Figure 2:
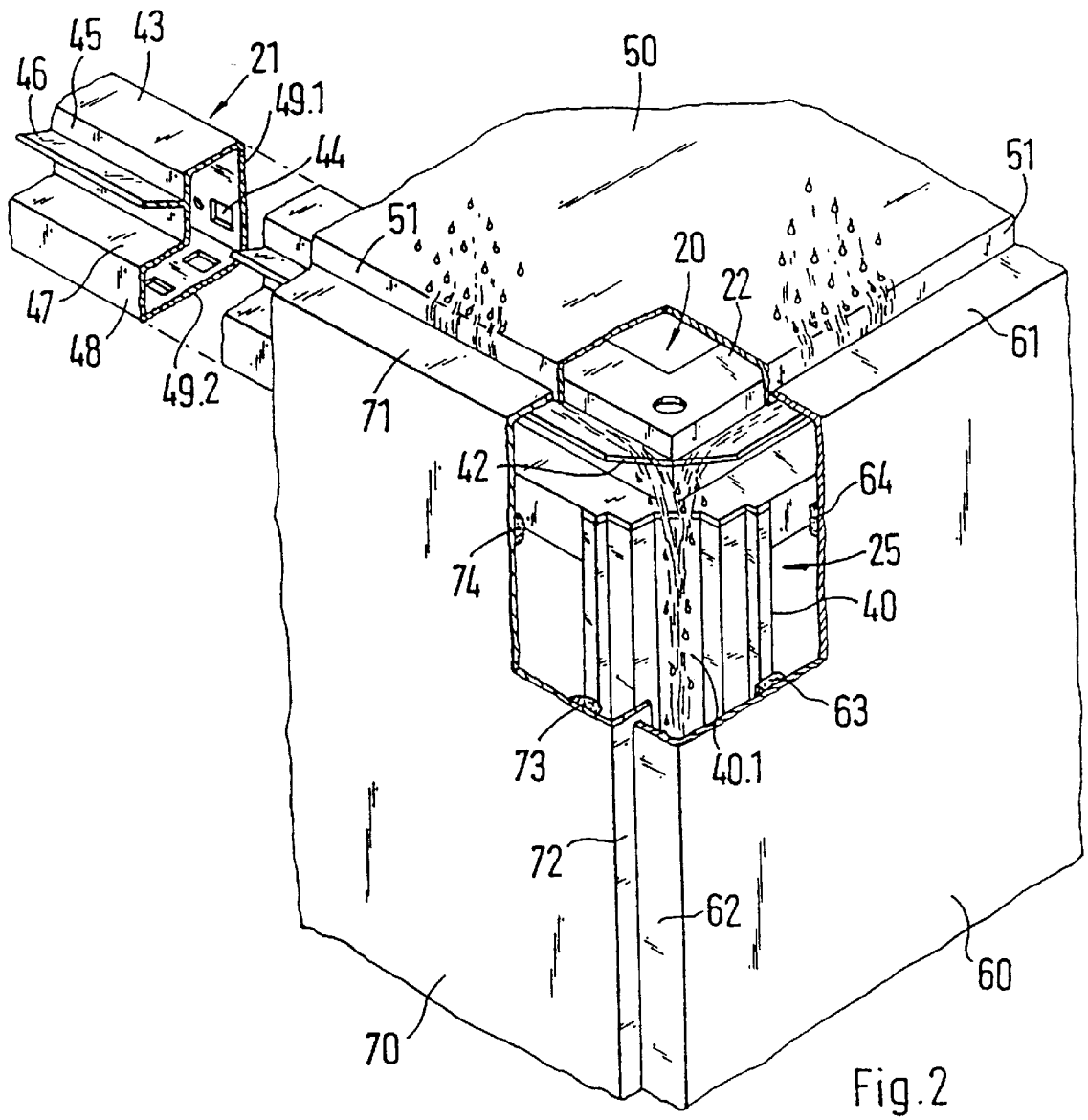
FIG. 2 shows in partial perspective view a corner area of a rack in accordance with FIG. 1, with attached cladding elements.

The layout of the runoff channels (46) is shown in FIG. 2. This illustration shows the rack in accordance with FIG. 1 in sections, wherein the rack is covered with side walls (60, 70) and a lid or cover (50). The vertical and lateral struts (21, 22) have a similar cross-section. Two interior walls (49.1, 49.2) face an interior chamber of the rack and are arranged at the struts (21, 22). The interior walls (49.1, 49.2) transition into sealing flanges (43, 48). The sealing flanges are angled off toward an outside at a right angle with respect to the interior walls (49.1, 49.2). Two outer walls (45, 47) connect to the sealing flanges (43, 48). The outer walls (45, 47) are parallel to the interior walls (49.1, 49.2). The runoff channel (46) is formed by a strip-like element which is connected at one broad side to the outer wall (45). The strip-like element extends at an angle to the outer wall (45), to form a runoff channel (46) having a V-shaped cross-section. The struts (21, 22) are preferably in the form of stamped and bent parts. However, it is also possible to use an extrusion profile.

As also shown in FIG. 2, the individual runoff channels (46) meet in the corner area of the upper frame (20) and at their front face ends have a cut-out section (42), so that a common drain is created.

The cover (50) is angled off vertically downwards at its sides so that edges (51) result. In the area connecting to the edges (51), the cover (50) is placed on the sealing flange (43) of the struts (21 and 22) while an intermediate layer of a sealing element is provided.

The sides of the rack are covered by side walls (60, 70). In the place of the side walls (60, 70), however, cabinet doors may be provided. The side walls (60, 70) have horizontal and vertical edges (61, 62) or (71, 72). In order to achieve a seal with respect to the upper frame (20), seals (64, 74) are applied to the inside of the side walls (60, 70) and rest against the sealing flanges (48) of the struts (21, 22). The horizontal edges (61, 71) of the side walls (60, 70) cover the runoff channels (46).

A narrow gap is left only between the edge (51) of the cover (50) and the edges (61, 71). The vertical edges (62, 72) of the side walls (60, 70) meet, so that it is not possible to see into the vertical frame profile (40). In this way, a flume (40.1) is created between the side walls (60, 70) and the vertical frame profile.

Rain or water spray collecting on the cover (50) is guided along the edges (51) of the cover (50) into the runoff channel (46). In the runoff channel (46), the collected water reaches the corner areas of the cover frame (20). Since in the corner areas the cut-out sections (42) are on the runoff channels (46), the water may be introduced into the flume (40.1). In the flume (40.1), the water is guided away downwards. Since the side walls (60, 70) are sealed by means of seals (63, 73) at the vertical frame profile (40), the water cannot reach the interior of the switching cabinet.

What is claimed is:

1. In a rack for a switching cabinet which can be enclosed by side walls having at least one cabinet door and a cover and a lower and an upper frame that can be connected by vertically extending frame profiles, wherein the upper frame has horizontally extending longitudinal struts and lateral struts and wherein the longitudinal struts and the lateral struts have runoff channels in which water running off the cover can be collected and guided away, the improvement comprising:

the runoff channels (46) of adjacent ones of the longitudinal struts and the lateral struts (21, 22) meeting in a corner area of the rack and directed to a flume (40.1) of the vertical frame profile (40).

2. In a rack in accordance with claim 1, wherein the longitudinal struts and the lateral struts (21, 22) carry a sealing flange (43) against which the cover (50) is tightly placed, the sealing flanges (43) meet to form a surrounding sealing frame at corners of the upper frame (20), and downwardly directed outside walls (45) connect to the sealing flange (43) which carry the runoff channels (46).

3. In a rack in accordance with claim 2, wherein the runoff channels (46) are formed as strip-like elements connected on a broad side of the strip-like elements to the longitudinal struts and the lateral struts (21, 22), the runoff channels (46) are guided in the corner area of the cover frame (20) at a connection point to the longitudinal struts and the lateral struts (21, 22), and the runoff channels (46) feed at ends of the runoff channels (46) into the flume (40.1).

4. In a rack in accordance with claim 3, wherein the runoff channels (46) formed from the strip-like elements have on end faces in the corner area of the upper frame (20) a cut-out section (42).

5. In a rack in accordance with claim 4, wherein on an outer side which faces away from the interior of the rack the vertical frame profiles (40) have a profiled outer mounting which forms the flume (40.1).

6. In a rack in accordance with claim 5, wherein the cover (50) has a surrounding, down-angled edge (51) which introduces water collected on the cover (50) into the runoff channels (46).

7. In a rack in accordance with claim 6, wherein at least one of the side walls (60, 70) and the cabinet door has an upper horizontal edge (61, 71) arranged above the runoff channel (46) and a distance away from the runoff channel (46).

8. In a rack in accordance with claim 6, wherein the upper frame and the lower frame (20 and 10) of the rack are constructed identically.

9. In a rack in accordance with claim 1, wherein the runoff channels (46) are formed as strip-like elements connected on a broad side of the strip-like elements to the longitudinal struts and the lateral struts (21, 22), the runoff channels (46) are guided in the corner area of the cover frame (20) at a connection point to the longitudinal struts and the lateral struts (21, 22), and the runoff channels (46) feed at ends of the runoff channels (46) into the flume (40.1).

10. In a rack in accordance with claim 9, wherein the runoff channels (46) formed from the strip-like elements have on end faces in the corner area of the upper frame (20) a cut-out section (42).

11. In a rack in accordance with claim 1, wherein on an outer side which faces away from the interior of the rack the vertical frame profiles (40) have a profiled outer mounting which forms the flume (40.1).

12. In a rack in accordance with claim 1, wherein the cover (50) has a surrounding, down-angled edge (51) which introduces water collected on the cover (50) into the runoff channels (46).

13. In a rack in accordance with claim 1, wherein at least one of the side walls (60, 70) and the cabinet door has an upper horizontal edge (61, 71) arranged above the runoff channel (46) and a distance away from the runoff channel (46).

14. In a rack in accordance with claim 1, wherein the upper frame and the lower frame (20 and 10) of the rack are constructed identically.

* * * * *